(12) United States Patent
Wu et al.

(10) Patent No.: US 11,244,321 B2
(45) Date of Patent: Feb. 8, 2022

(54) SYSTEM, METHOD, AND COMPUTER PROGRAM PRODUCT FOR EVALUATING A FRAUD DETECTION SYSTEM

(71) Applicant: Visa International Service Association, San Francisco, CA (US)

(72) Inventors: Yuhang Wu, Santa Clara, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 5 days.

(21) Appl. No.: 16/590,500

(22) Filed: Oct. 2, 2019

(65) Prior Publication Data
US 2021/0103926 A1 Apr. 8, 2021

(51) Int. Cl.
*G06Q 20/40* (2012.01)
*G06N 20/00* (2019.01)
*G06F 16/22* (2019.01)

(52) U.S. Cl.
CPC ......... *G06Q 20/4016* (2013.01); *G06N 20/00* (2019.01); *G06F 16/22* (2019.01)

(58) Field of Classification Search
CPC ................................................ G06Q 20/4016
See application file for complete search history.

(56) References Cited

U.S. PATENT DOCUMENTS

| | | | | |
|---|---|---|---|---|
| 2014/0089193 A1* | 3/2014 | Boding | ................... | G06Q 30/06 705/44 |
| 2015/0046224 A1* | 2/2015 | Adjaoute | ........... | G06Q 20/4016 705/7.31 |
| 2016/0071017 A1* | 3/2016 | Adjaoute | ............... | G06N 20/00 706/52 |
| 2018/0330379 A1* | 11/2018 | Zoldi | .................... | G06N 3/0454 |
| 2020/0058399 A1* | 2/2020 | Chen | ......................... | G06N 3/08 |
| 2020/0210808 A1* | 7/2020 | Dong | ................... | G06N 3/0454 |

FOREIGN PATENT DOCUMENTS

EP 3416123 A1 * 12/2018 ......... G06Q 20/4016

OTHER PUBLICATIONS

"Gargi Vyas, Qlearning, Jul. 26, 2019, AITS Journal, entire document" (Year: 2019).*

* cited by examiner

*Primary Examiner* — Hani M Kazimi
*Assistant Examiner* — Adam Hilmantel
(74) *Attorney, Agent, or Firm* — The Webb Law Firm

(57) ABSTRACT

Provided are methods that include determining a set of transaction related actions for an agent, selecting a first transaction related action from the set of transaction related actions for the agent based on a plurality of features associated with the agent, generating transaction data associated with a fraudulent transaction based on the first transaction related action, generating a feature vector, the feature vector including transaction data associated with the fraudulent transaction, providing the feature vector as an input to a fraud detection machine learning model. Methods may also include determining an output of the fraud detection machine learning model based on the feature vector as the input, and generating a fraudulent reward parameter for the first transaction related action based on the output of the fraud detection machine learning model. Systems and computer program products are also provided.

20 Claims, 13 Drawing Sheets

| Transaction related action | Fraudulent Transaction |
|---|---|
| A1 | [Merchant 1, $4.88] |
| A2 | [Merchant 2, $20.00] |
| A2 | [Merchant 3, $200.00] |
| A2 | [Merchant 4, $2,000] |
| A3 | [Merchant 5, $78.04] |
| A4 | [Merchant 6, $459.00] |
| A5 | [Merchant 7, $54.19] |

Fraud Detection System 102

Determine a set of transaction related actions for an agent
425

FIG. 4B

| Transaction related action | Action parameters |
|---|---|
| A1 | [Merchant 1, $4.88] |
| A2 | [Merchant 2, $20.00] |
| A2 | [Merchant 3, $200.00] |
| A2 | [Merchant 4, $2,000] |
| A3 | [Merchant 5, $78.04] |
| A4 | [Merchant 6, $459.00] |
| A5 | [Merchant 7, $54.19] |

SYSTEM, METHOD, AND COMPUTER PROGRAM PRODUCT FOR EVALUATING A FRAUD DETECTION SYSTEM

BACKGROUND

1. Field

This disclosure relates generally to fraud detection and, in some non-limiting embodiments or aspects, to systems, methods, and computer program products for evaluating a fraud detection system that may implement a machine learning model.

2. Technical Considerations

Machine learning may be a field of computer science that uses statistical techniques to provide a computer system with the ability to learn (e.g., to progressively improve performance of) a task with data without the computer system being explicitly programmed to perform the task. In some instances, a machine learning model may be developed for a set of data so that the machine learning model may perform a task (e.g., a task associated with a prediction) with regard to the set of data. In one example, a machine learning model may be developed to identify fraudulent transactions (e.g., fraudulent payment transactions). In some instances, the machine learning model may include a fraud detection machine learning model that is used to determine whether a transaction from a set of transactions is a fraudulent transaction based on data associated with the set of transactions.

However, it may be difficult to identify a vulnerability of a fraud detection machine learning model. For example, it may be difficult to determine whether the fraud detection machine learning model will incorrectly identify a transaction of a set of transactions as a non-fraudulent transaction as opposed to a fraudulent transaction. Furthermore, it may be difficult to determine a level of severity of the vulnerability of the fraud detection model. For example, it may be difficult to determine whether the transaction of the set of transactions that was incorrectly identified as a non-fraudulent transaction will provide a reward to an actor that carries out such a fraudulent transaction.

SUMMARY

Accordingly, disclosed are systems, methods, and computer program products for evaluating fraud detection systems.

According to some non-limiting embodiments or aspects, provided is a method for evaluating a fraud detection system. The method may include determining, with at least one processor, a set of transaction related actions for an agent; selecting, with at least one processor, a first transaction related action from the set of transaction related actions for the agent based on a plurality of features associated with the agent; generating, with at least one processor, transaction data associated with a fraudulent payment transaction based on the first transaction related action; generating, with at least one processor, a feature vector, wherein the feature vector comprises transaction data associated with the fraudulent payment transaction; providing, with at least one processor, the feature vector as an input to a fraud detection machine learning model; determining, with at least one processor, an output of the fraud detection machine learning model based on the feature vector as the input; and generating, with at least one processor, a fraudulent reward parameter for the first transaction related action based on the output of the fraud detection machine learning model.

According to some non-limiting embodiments or aspects, provided is a system for evaluating a fraud detection system, the system including at least one processor programmed or configured to: determine a set of transaction related actions for an agent; selecting a first transaction related action from the set of transaction related actions for the agent based on a plurality of features associated with the agent; wherein, when selecting the first transaction related action, the plurality of features associated with the agent are provided as an input to an agent action machine learning model, and the first transaction related action is an output of the agent action machine learning model based on the input; generate transaction data associated with a fraudulent payment transaction based on the first transaction related action; generate a feature vector, wherein the feature vector comprises transaction data associated with the fraudulent payment transaction; and provide the feature vector as an input to a fraud detection machine learning model; determine an output of the fraud detection machine learning model based on the feature vector as the input; and generate a fraudulent reward parameter for the first transaction related action based on the output of the fraud detection machine learning model.

According to some non-limiting embodiments or aspects, provided is a computer program product for evaluating a fraud detection system, the computer program product including at least one non-transitory computer-readable medium including one or more instructions that, when executed by at least one processor, cause the at least one processor to: determine a set of transaction related actions for an agent; select a first transaction related action from the set of transaction related actions for the agent based on a plurality of features associated with the agent; wherein, when selecting the first transaction related action, the plurality of features associated with the agent are provided as an input to an agent action machine learning model, and the first transaction related action is an output of the agent action machine learning model based on the input; generate transaction data associated with a fraudulent payment transaction based on the first transaction related action; generate a feature vector, wherein the feature vector comprises transaction data associated with the fraudulent payment transaction; and provide the feature vector as an input to a fraud detection machine learning model; determine an output of the fraud detection machine learning model based on the feature vector as the input; generate a fraudulent reward parameter for the first transaction related action based on the output of the fraud detection machine learning model; and update an agent action machine learning model based on the fraudulent reward parameter for the first transaction related action.

Further non-limiting embodiments or aspects are set forth in the following numbered clauses:

Clause 1: A method, comprising: determining, with at least one processor, a set of transaction related actions for an agent; selecting, with at least one processor, a first transaction related action from the set of transaction related actions for the agent based on a plurality of features associated with the agent; generating, with at least one processor, transaction data associated with a fraudulent transaction based on the first transaction related action; generating, with at least one processor, a feature vector, wherein the feature vector comprises transaction data associated with the fraudulent transaction; providing, with at least one processor, the feature vector as an input to a fraud detection machine learning model; determining, with at least one processor, an output of the fraud detection machine learning model based on the feature vector as the input; and generating, with at least one processor, a fraudulent reward parameter for the first transaction related action based on the output of the fraud detection machine learning model.

Clause 2: The method of clause 1, further comprising: generating, with at least one processor, a plurality of status indicators regarding fraudulent transaction outcomes associated with transaction related actions performed by the agent based on transaction data associated with a plurality of payment transactions.

Clause 3: The method of clauses 1 or 2, wherein the plurality of features associated with the agent are derived from historical transaction data associated with one or more historical transactions of the agent.

Clause 4: The method of any of clauses 1-3, further comprising: updating an agent action machine learning model based on the fraudulent reward parameter for the first transaction related action.

Clause 5: The method of any of clauses 1-4, wherein selecting the first transaction related action from the set of transaction related actions for the agent comprises: selecting the first transaction related action from the set of transaction related actions for the agent based on an agent action machine learning model; wherein the plurality of features associated with the agent are provided as an input to the agent action machine learning model; and wherein the first transaction related action is an output of the agent action machine learning model based on the input.

Clause 6: The method of any of clauses 1-5, further comprising: updating, with at least one processor, a weight parameter of the agent action machine learning model based on the fraudulent reward parameter.

Clause 7: The method of any of clauses 1-6, further comprising: assigning, with at least one processor, the fraudulent reward parameter to the first transaction; storing, with at least one processor, the first transaction related action and the fraudulent reward parameter in a data structure.

Clause 8: The method of any of clauses 1-7, further comprising: generating, with at least one processor, a plurality of fraudulent reward parameters for a sequence of transaction related actions based on a plurality of outputs of the fraud detection machine learning model; determining, with at least one processor, a fraudulent reward amount based on the plurality of fraudulent reward parameters; assigning, with at least one processor, the fraudulent reward amount to the sequence of transaction related actions; and storing the fraudulent reward amount and the sequence of transaction related actions in a data structure.

Clause 9: The method of any of clauses 1-8, further comprising: determining, with at least one processor, a plurality of sequences of transaction related actions that are each associated with a fraudulent reward amount; and selecting, with at least one processor, a sequence of transaction related actions from the plurality of sequences of transaction related actions that is associated with a maximum reward amount of a plurality of fraudulent reward amounts.

Clause 10: The method of any of clauses 1-9, further comprising: determining, with at least one processor, whether the fraud detection machine learning model is deployed in an active setting; and performing, with at least one processor, an action associated with enhancing fraud detection for a transaction to be conducted based on determining that the fraud detection machine learning model is deployed in the active setting.

Clause 11: A system, comprising: at least one processor programmed or configured to: determine a set of transaction related actions for an agent; selecting a first transaction related action from the set of transaction related actions for the agent based on a plurality of features associated with the agent; wherein, when selecting the first transaction related action, the plurality of features associated with the agent are provided as an input to an agent action machine learning model, and the first transaction related action is an output of the agent action machine learning model based on the input; generate transaction data associated with a fraudulent transaction based on the first transaction related action; generate a feature vector, wherein the feature vector comprises transaction data associated with the fraudulent transaction; provide the feature vector as an input to a fraud detection machine learning model; determine an output of the fraud detection machine learning model based on the feature vector as the input; and generate a fraudulent reward parameter for the first transaction related action based on the output of the fraud detection machine learning model.

Clause 12: The system of clause 11, wherein the at least one processor is further programmed or configured to: generate a plurality of status indicators regarding fraudulent transaction outcomes associated with transaction related actions performed by the agent based on transaction data associated with a plurality of payment transactions.

Clause 13: The system of clauses 11 or 12, wherein the at least one processor is programmed or configured to derive the plurality of features associated with the agent from historical transaction data associated with one or more historical transactions of the agent.

Clause 14: The system of any of clauses 11-13, wherein the at least one processor is further programmed or configured to: update an agent action machine learning model based on the fraudulent reward parameter for the first transaction related action.

Clause 15: The system of any of clauses 11-14 wherein the at least one processor is further programmed or configured to: update a weight parameter of the agent action machine learning model based on the fraudulent reward parameter.

Clause 16: A computer program product comprising at least one non-transitory computer-readable medium comprising one or more instructions that, when executed by at least one processor, cause the at least one processor to: determine a set of transaction related actions for an agent; select a first transaction related action from the set of transaction related actions for the agent based on a plurality of features associated with the agent; wherein, when selecting the first transaction related action, the plurality of features associated with the agent are provided as an input to an agent action machine learning model, and the first transaction related action is an output of the agent action machine learning model based on the input; generate transaction data associated with a fraudulent transaction based on the first transaction related action; generate a feature vector, wherein the feature vector comprises transaction data associated with the fraudulent transaction; provide the feature vector as an input to a fraud detection machine learning model; determine an output of the fraud detection machine learning model based on the feature vector as the input; generate a fraudulent reward parameter for the first transaction related action based on the output of the fraud detection machine learning model; and update an agent action machine learning model based on the fraudulent reward parameter for the first transaction related action.

Clause 17: The computer program product of clause 16, wherein the one or more instructions further cause the at least one processor to: generate a plurality of status indicators regarding fraudulent transaction outcomes associated with transaction related actions performed by the agent based on transaction data associated with a plurality of payment transactions.

Clause 18: The computer program product of clauses 16 or 17, wherein the one or more instructions further cause the at least one processor to derive the plurality of features associated with the agent from historical transaction data associated with one or more historical transactions of the agent.

Clause 19: The computer program product of any of clauses 16-18, wherein the one or more instructions further cause the at least one processor to: update a weight parameter of the agent action machine learning model based on the fraudulent reward parameter.

Clause 20: The computer program product of any of clauses 16-19, wherein the one or more instructions further cause the at least one processor to: assign the fraudulent reward parameter to the first transaction; and store the first transaction related action and the fraudulent reward parameter in a data structure.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of non-limiting embodiments or aspects of the present disclosure are explained in greater detail below with reference to the exemplary embodiments that are illustrated in the accompanying schematic figures, in which:

FIGS. 4A-4K are diagrams of a non-limiting embodiment of an implementation of a process for evaluating a fraud detection system.

DESCRIPTION

Figure 1:
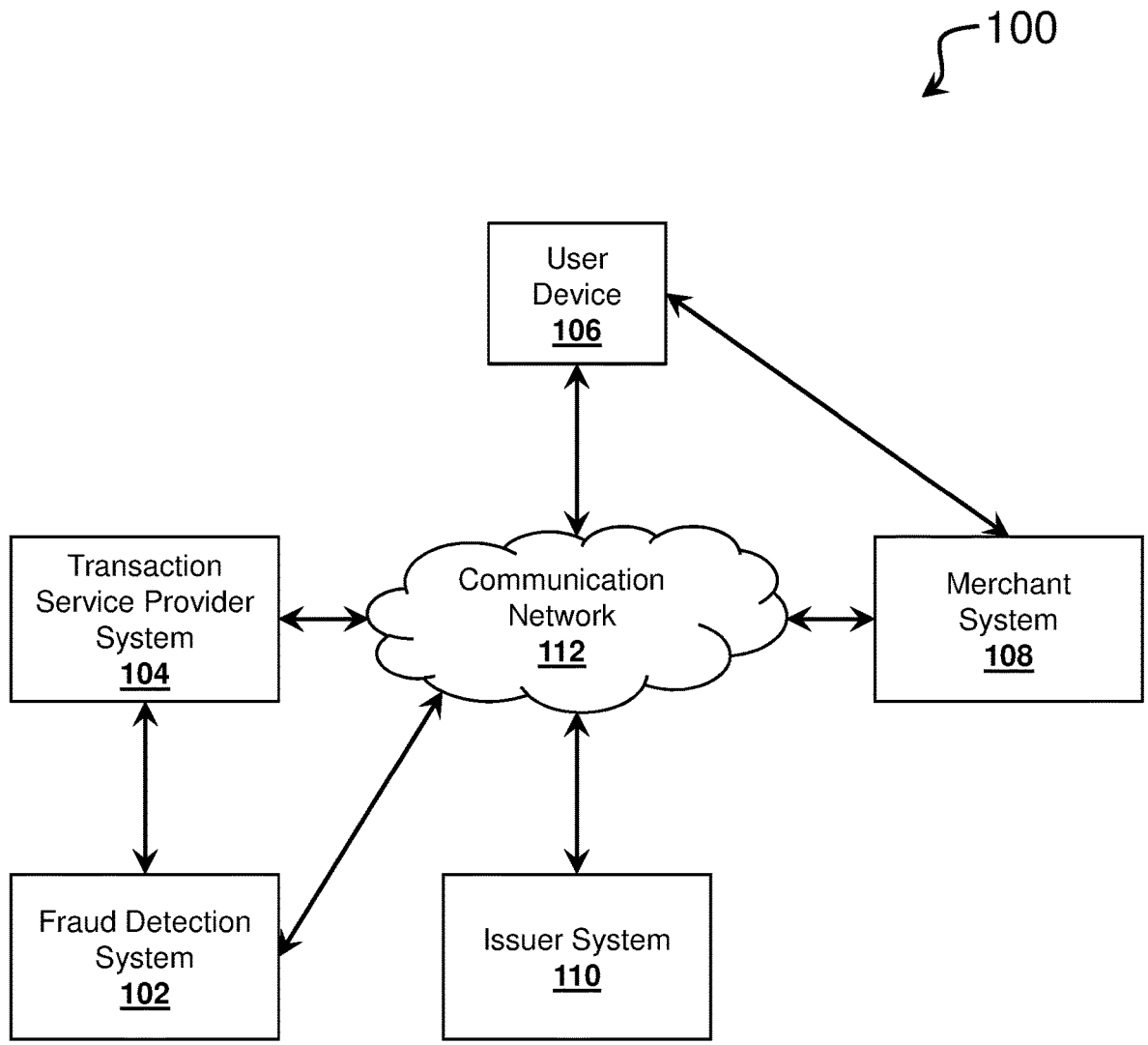
FIG. 1 is a diagram of a non-limiting embodiment or aspect of an environment in which devices, systems, methods, and/or computer program products described herein may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions such as such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments, a transaction service provider may include a credit card company, a debit card company, a payment network such as Visa®, MasterCard®, American Express®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "payment gateway" may refer to an entity and/or a payment processing system operated by or on behalf of such an entity (e.g., a merchant service provider, a payment gateway service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway service provider system" may refer to one or more computer systems, computer devices, servers, groups of servers, and/or the like operated by or on behalf of a payment gateway.

As used herein, the term "payment device" may refer to a payment card (e.g., a credit or debit card), a gift card, a smart card (e.g., a chip card, an integrated circuit card, and/or the like), smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. In some non-limiting embodiments, a computing device may include a mobile device. A mobile device may include a smartphone, a portable computer, a wearable device (e.g., watches, glasses, lenses, clothing, and/or the like), a personal digital assistant (PDA), and/or other like devices. In some non-limiting embodiments, a computing device may include a server, a desktop computer, and/or the like.

As used herein, the terms "client" and "client device" may refer to one or more computing devices, such as processors, storage devices, and/or similar computer components, that access a service made available by a server. In some non-limiting embodiments, a "client device" may refer to one or more devices that facilitate payment transactions, such as one or more POS devices used by a merchant. In some non-limiting embodiments, a client device may include a computing device configured to communicate with one or more networks and/or facilitate payment transactions such as, but not limited to, one or more desktop computers, one or more mobile devices, and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or clients.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In some non-limiting embodiments or aspects, systems, computer-implemented methods, and computer program products are disclosed. For example, a system may include at least one processor programmed or configured to: determine a set of transaction related actions for an agent; selecting a first transaction related action from the set of transaction related actions for the agent based on a plurality of features associated with the agent; wherein, when selecting the first transaction related action, the plurality of features associated with the agent are provided as an input to an agent action machine learning model, and the first transaction related action is an output of the agent action machine learning model based on the input; generate transaction data associated with a fraudulent payment transaction based on the first transaction related action; generate a feature vector, wherein the feature vector comprises transaction data associated with the fraudulent payment transaction; and provide the feature vector as an input to a fraud detection machine learning model; determine an output of the fraud detection machine learning model based on the feature vector as the input; and generate a fraudulent reward parameter for the first transaction related action based on the output of the fraud detection machine learning model.

In this way, non-limiting embodiments and/or aspects of the present disclosure may allow for systems (e.g., fraud detection systems) to identify a vulnerability of a fraud detection machine learning model. For example, by virtue of the features described herein, systems may determine whether fraud detection machine learning models will incorrectly identify a transaction of a set of transactions as a non-fraudulent transaction as opposed to a fraudulent transaction. Furthermore, systems may determine a level of severity of the vulnerability of the fraud detection model. For example, systems may determine whether the transaction of the set of transactions that was incorrectly identified as a non-fraudulent transaction will provide a reward to an actor that carries out such a fraudulent transaction. In this way, systems may be able to conserve computing resources by more accurately identifying fraudulent transactions, thereby reducing and/or eliminating the need for subsequent communication between one or more computing devices (e.g., one or more computing devices of environment 100, described herein) to reverse the fraudulent transaction.

Referring now to FIG. 1, illustrated is a diagram of an example environment 100 in which devices, systems, methods, and/or products described herein may be implemented. As illustrated in FIG. 1, environment 100 includes fraud detection system 102, transaction service provider system 104, user device 106, merchant system 108, issuer system 110, and communication network 112. Fraud detection system 102, transaction service provider system 104, user device 106, merchant system 108, issuer system 110 may interconnect (e.g., establish a connection to communicate and/or the like) via wired and wireless connections.

Fraud detection system 102 may include one or more devices capable of being in communication with transaction service provider system 104, user device 106, merchant system 108, and issuer system 110 via communication network 112. For example, fraud detection system 102 may include one or more computing devices, such as one or desktop computers, laptop computers, servers, and/or like devices. In some non-limiting embodiments or aspects, fraud detection system 102 may be associated with a transaction service provider and/or a payment gateway service provider, as described herein. For example, fraud detection system 102 may be operated by a transaction service provider and/or a payment gateway service provider. In some non-limiting embodiments or aspects, fraud detection system 102 may be a component of a transaction service provider system and/or a payment gateway service provider system.

Transaction service provider system 104 may include one or more devices capable of being in communication with fraud detection system 102, user device 106, merchant system 108, and issuer system 110 via communication network 112. For example, transaction service provider system 104 may include one or more computing devices, such as one or more desktop computers, laptop computers, servers, and/or like devices. In some non-limiting embodiments or aspects, transaction service provider system 104 may be associated with a transaction service provider and/or a payment gateway service provider, as described herein. For example, transaction service provider system 104 may be operated by a transaction service provider and/or a payment gateway service provider as described herein.

User device 106 may include one or more devices capable of being in communication with fraud detection system 102, transaction service provider system 104, merchant system 108, and issuer system 110 via communication network 112. For example, user device 106 may include one or more computing devices, such as one or more payment devices, one or more mobile devices (e.g., a smartphone, tablet, and/or the like), and/or other like devices. In some non-limiting embodiments or aspects, user device 106 may be associated with a user, as described herein.

Merchant system 108 may include one or more devices capable of being in communication with fraud detection system 102, transaction service provider system 104, user device 106, and issuer system 110 via communication network 112. For example, merchant system 108 may include one or more computing devices, such as one or more POS devices, one or more POS systems, one or more servers, and/or other like devices. In some non-limiting embodiments or aspects, merchant system 108 may be associated with a merchant, as described herein.

Issuer system 110 may include one or more devices capable of being in communication with fraud detection system 102, transaction service provider system 104, user device 106, and merchant system 108 via communication network 112. For example, issuer system 110 may include one or more computing devices, such as one or more desktop computers, laptop computers, servers, and/or like devices. In some non-limiting embodiments or aspects, issuer system may be associated with an issuer, as described herein.

Communication network 112 may include one or more wired and/or wireless networks. For example, communication network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
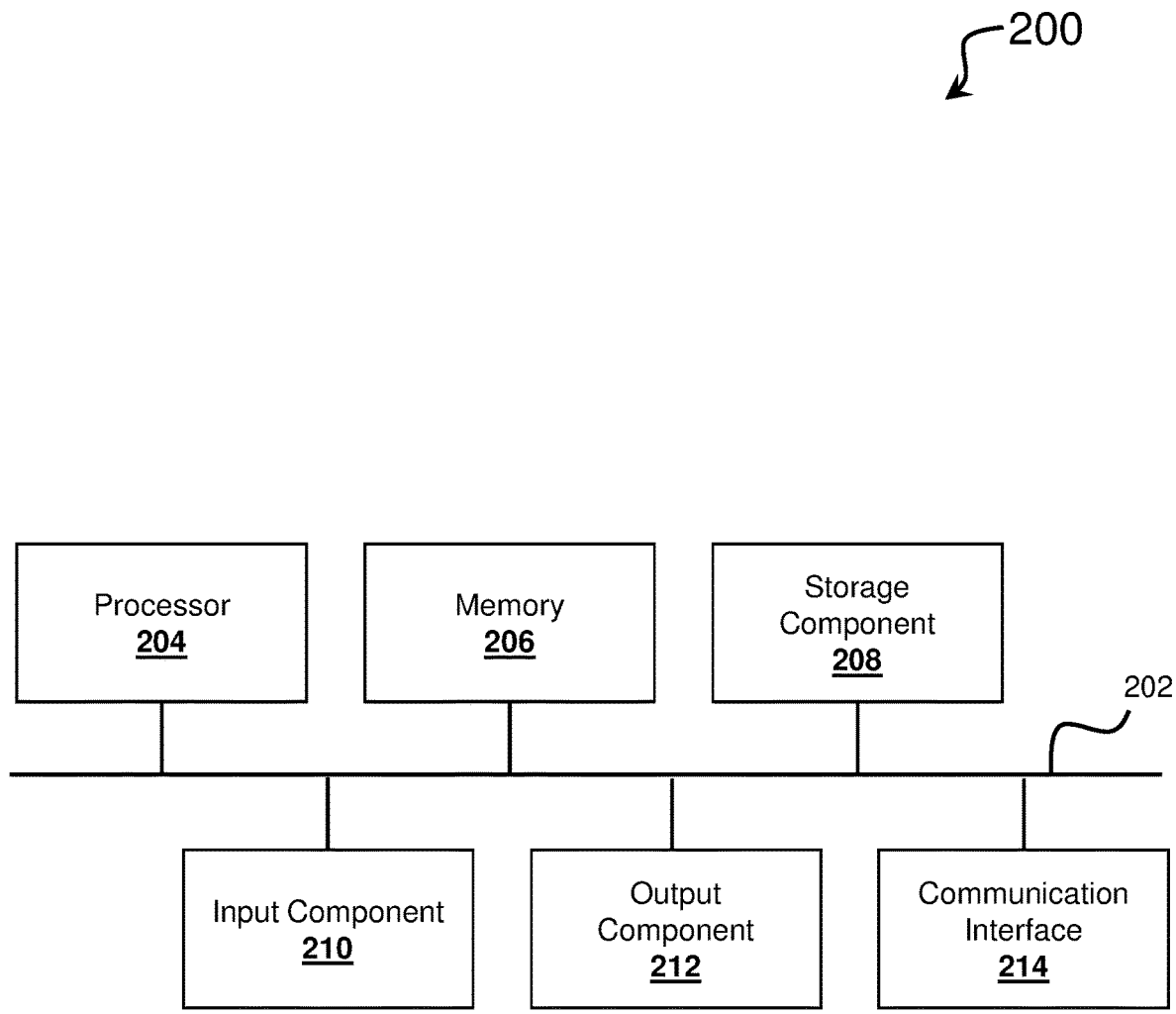
FIG. 2 is a diagram of a non-limiting aspect or embodiment of components of one or more devices and/or one or more systems of FIG. 1.

Referring now to FIG. 2, illustrated is a diagram of example components of device 200. Device 200 may correspond to fraud detection system 102 (e.g., one or more devices of fraud detection system 102), transaction service provider system 104 (e.g., one or more devices of transaction service provider system 104), user device 106, merchant system 108 (e.g., one or more devices of merchant system 108), issuer system 110 (e.g., one or more devices of issuer system 110), and/or communication network 112 (e.g., one or more devices of communication network 112). In some non-limiting embodiments or aspects, fraud detection system 102, transaction service provider system 104, user device 106, merchant system 108, issuer system 110, and/or communication network 112 may include at least one device 200 and/or at least one component of device 200. As illustrated in FIG. 2, device 200 may include bus 202, processor 204, memory 206, storage component 208, input component 210, output component 212, and/or communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of retrieving information from, storing information in, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
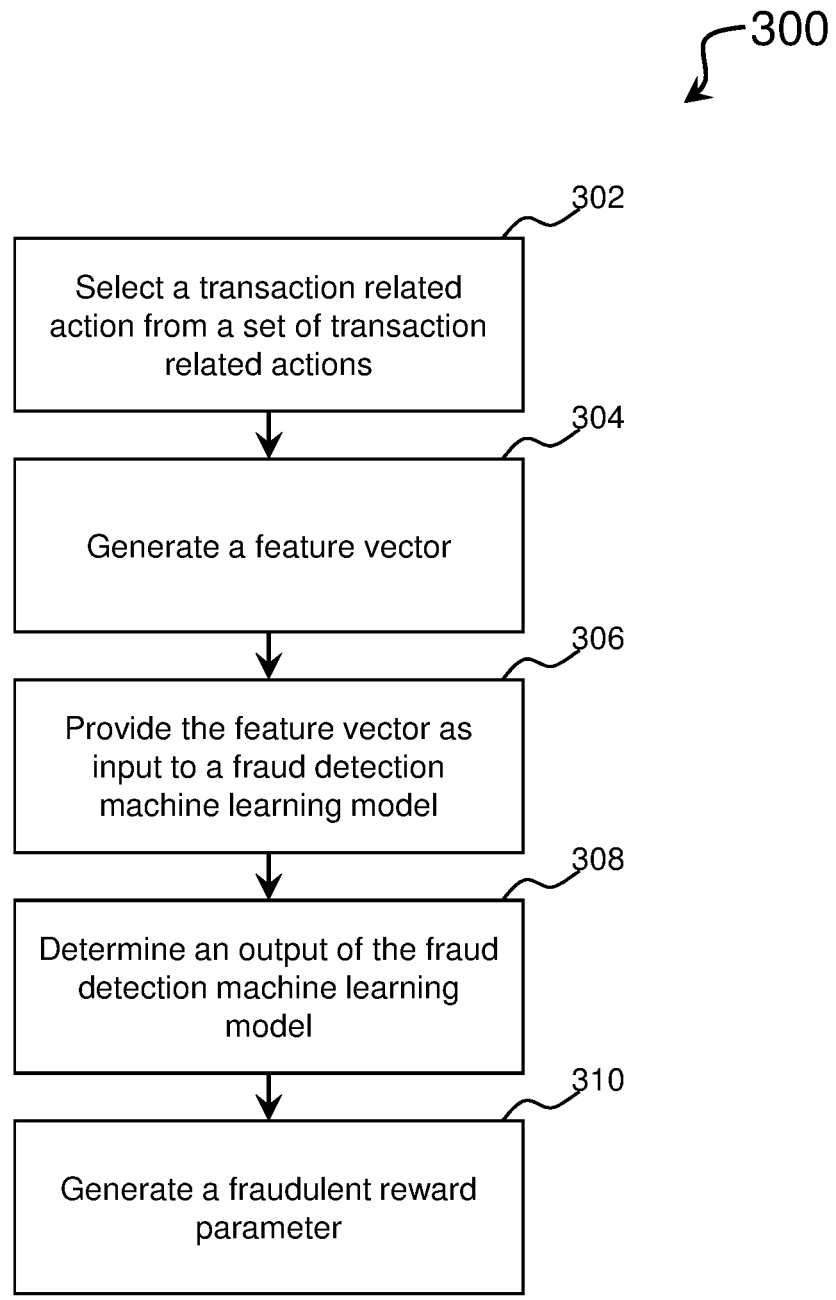
FIG. 3 is a flowchart of a non-limiting embodiment or aspect of a process for evaluating a fraud detection system.

Referring now to FIG. 3, illustrated is a flowchart of a non-limiting embodiment or aspect of a process 300 for evaluating a fraud detection system. In some non-limiting embodiments or aspects, one or more of the steps and/or functions described with respect to process 300 may be performed (e.g., completely, partially, and/or the like) by fraud detection system 102. In some non-limiting embodiments or aspects, one or more of the steps and/or functions of process 300 may be performed (e.g., completely, partially, and/or the like) by another device or a group of devices separate from and/or including fraud detection system 102 such as, for example, transaction service provider system 104, user device 106, merchant system 108, and/or issuer system 110.

As illustrated in FIG. 3, at step 302, process 300 may include selecting a transaction related action from a set of transaction related actions. For example, fraud detection system 102 may select a first transaction related action from the set of transaction related actions based on (e.g., after) determining the set of transaction related actions. In some non-limiting embodiments or aspects, fraud detection system 102 may select the first transaction related action based on a plurality of features associated with the agent. For example, fraud detection system 102 may select the first transaction related action based on determining the plurality of features associated with the agent. In such an example, fraud detection system 102 may determine the plurality of features associated with the agent based on one or more historical transactions involving the account of the user.

As further illustrated in FIG. 3, at step 302, process 300 may include determining a set of transaction related actions. For example, fraud detection system 102 may determine a set of transaction related actions for an agent (e.g., a simulated adversarial actor that is designed to engage in fraudulent conduct involving an account of a user). In some non-limiting embodiments or aspects, the set of transaction related actions may include one or more predetermined transaction related actions to be performed involving an account of user. The one or more predetermined transaction related actions may be stored in a database. In some non-limiting embodiments, the one or more predetermined transaction related actions may include an action associated with conducting a payment transaction. For example, the one or more predetermined transaction related actions may include an action associated with conducting a payment transaction that was identified as being fraudulent (e.g., one or more previously-identified and/or previously-processed fraudulent payment transactions involving an account of user associated with user device 106). The payment transaction may have been identified as fraudulent by transaction service provider system 104 and/or merchant system 108.

In some non-limiting embodiments or aspects, fraud detection system 102 may determine a time duration for conducting a simulation that involves the set of transaction related actions for the agent. The time duration may include a start time (e.g., a starting time of a day and/or a date) and an end time (e.g., an ending time of a day and/or a date). Additionally or alternatively, the time duration may include a time interval (e.g., an increment of time) at which a transaction related action for the agent may be performed during the time duration. The time interval may include a fixed number or a variant number (e.g., a number that changes based on a number of time intervals involved in a simulation). In some non-limiting embodiments or aspects, the simulation may involve fraud detection system 102 performing one or more (e.g., some or all) of the set of transaction related actions for the agent.

In some non-limiting embodiments, fraud detection system 102 may determine the set of transaction related actions based on data associated with one or more merchants. For example, fraud detection system 102 may determine the set of transaction related actions based on product data associated with one or more products sold by a merchant and/or identification data associated with an identification of a merchant. Product data associated with one or more products sold by the merchant may include one or more prices of one or more products sold by a merchant, a range of prices for one or more products sold by a merchant, and/or the like. Identification data associated with an identification of a merchant may include a name of a merchant, an identifier of a merchant, and/or the like.

In some non-limiting embodiments, fraud detection system 102 may determine the set of transaction related actions based on historical transaction data associated with one or more historical transactions involving an account of a user. For example, fraud detection system 102 may receive the historical transaction data associated with the one or more historical transactions involving the account of the user and fraud detection system 102 may derive the set of transaction related actions based on the historical transaction data. In some non-limiting embodiments or aspects, the one or more historical transactions may include a sequence of historical transactions.

Additionally or alternatively, the one or more historical transactions may be associated with the agent. For example, fraud detection system 102 may receive historical transaction data associated with one or more historical transactions from transaction service provider system 104 and/or issuer system 110. The historical transaction data associated with the one or more historical transactions involving the account of the user may include one or more transaction parameters such as, for example, a transaction amount, a transaction time, an indication that a merchant is a frequently visited merchant, an indication that a merchant location is a frequently visited merchant location, an indication that an area is a frequently visited area, a number of times a merchant is visited within a time period, issuer data associated with issuer system 110, a credit score of the agent, and/or the like.

In some non-limiting embodiments or aspects, fraud detection system 102 may generate a plurality of status indicators based on one or more historical payment transactions involving the account of the user. For example, fraud detection system 102 may generate a historical transaction table that includes the plurality of status indicators based on the one or more historical payment transactions involving the account of the user. A status indicator may include an indication of a status of the one or more historical payment transactions as being (e.g., as being detected as) a fraudulent transaction (e.g., a binary 1) or a non-fraudulent transaction (e.g., a binary 0).

In some non-limiting embodiments or aspects, fraud detection system 102 may select the first transaction related action from the set of transaction related actions for the agent based on an agent action machine learning model. For example, fraud detection system 102 may provide feature data associated with the plurality of features that are associated with the agent as input to an agent action machine learning model and, based on providing the feature data as input to the agent action machine learning model, fraud detection system 102 may receive an output from the agent action machine learning model. In such an example, the output may be associated with the first transaction related action. In an example, fraud detection system 102 may provide the feature data associated with the plurality of features that are associated with the agent as input to the agent action machine learning model and, based on providing the feature data as input, receive the first transaction related action, a plurality of transaction related actions including the first transaction related action, a sequence of transaction related actions, and/or the like, as an output from the agent action machine learning model.

In some non-limiting embodiments or aspects, fraud detection system 102 may determine a plurality of sequences of transaction related actions. For example, fraud detection system 102 may determine the plurality of sequences of transaction related actions based on providing the feature data associated with the plurality of features of the agent as input to the agent action machine learning model. In some non-limiting embodiments or aspects, fraud detection system 102 may determine that a plurality of sequences of transaction related actions are associated with a fraudulent reward amount. In such an example, the fraudulent reward amount may be an aggregation of the values of the fraudulent transactions represented by the plurality of sequences of transaction related actions.

In some non-limiting embodiments or aspects, fraud detection system 102 may generate transaction data associated with a fraudulent transaction. For example, fraud detection system 102 may generate the transaction data associated with the fraudulent transaction based on one or more transaction related actions. In some non-limiting embodiments or aspects, fraud detection system 102 may generate the one or more fraudulent transactions based on one or more sequences of transaction related actions. In such an example, the one or more sequences of transaction related actions may be the one or more sequences of transaction related actions selected by fraud detection system 102.

In some non-limiting embodiments or aspects, fraud detection system 102 may update historical transaction data associated with the one or more historical transactions involving the account of the user based on generating the transaction data associated with the fraudulent transaction. For example, fraud detection system 102 may update a historical transaction table to include a status indicator associated with the fraudulent transaction. Fraud detection system 102 may determine the set of transaction related actions based on the historical transaction data. In some non-limiting embodiments or aspects, the one or more historical transactions may include a sequence of historical transactions.

As illustrated in FIG. 3, at step 304, process 300 may include generating a feature vector. For example, fraud detection system 102 may generate a feature vector. In one example, fraud detection system 102 may generate the feature vector after generating the transaction data associated with the one or more fraudulent transactions. In some non-limiting embodiments or aspects, fraud detection system 102 may generate the feature vector based on the transaction data associated with one or more transactions. For example, fraud detection system 102 may generate the feature vector based on transaction data associated with one or more fraudulent transactions (e.g., one or more fraudulent transactions generated based on the one or more transaction related actions) and/or one or more non-fraudulent transactions. In some non-limiting embodiments or aspects, fraud detection system 102 may generate a feature vector based on the transaction data where the transaction data includes the plurality of status indicators. For example, fraud detection system 102 may generate the feature vector based on the transaction data associated with the one or more fraudulent transactions and/or the one or more non-fraudulent transactions, the one or more fraudulent transactions and/or the one or more non-fraudulent transactions associated with corresponding status indicators from among the plurality of status indicators.

As illustrated in FIG. 3, at step 306, process 300 may include providing the feature vector as input to a fraud detection machine learning model. For example, fraud detection system 102 may provide the feature vector as input to a fraud detection machine learning model. In such an example, fraud detection system 102 may receive an output from the fraud detection machine learning model. The output from the fraud detection machine learning model may include a prediction (e.g., a prediction that one or more payment transactions are fraudulent transactions or non-fraudulent transactions).

As illustrated in FIG. 3, at step 308, process 300 may include determining an output of the fraud detection machine learning model. For example, fraud detection system 102 may determine an output of the fraud detection machine learning model based on providing the feature vector as input to the fraud detection machine learning model. In some non-limiting embodiments or aspects, fraud detection system 102 may determine that the output is associated with an indication that one or more payment transactions are fraudulent payment transactions or non-fraudulent payment transactions. For example, fraud detection system 102 may determine that the output of the fraud detection machine learning model is associated with an indication that one or more payment transactions associated with the transaction data are fraudulent payment transactions and/or that one or more payment transactions associated with the transaction data are non-fraudulent payment transactions.

As illustrated in FIG. 3, at step 310, process 300 may include generating a fraudulent reward parameter. For example, fraud detection system 102 may generate a fraudulent reward parameter for a transaction related action. In some non-limiting embodiments or aspects, fraud detection system 102 may generate the fraudulent reward parameter for a first transaction related action of a set of transaction related actions based on an output of the fraud detection machine learning model. For example, fraud detection system 102 may determine the output of the fraud detection machine learning model and fraud detection system 102 may determine the fraudulent reward parameter for the first transaction related action based on the output of the fraud detection machine learning model. In one example, fraud detection system 102 may determine the output of the fraud detection machine learning model based on fraud detection system 102 assigning a fraudulent reward parameter to the first transaction.

In some non-limiting embodiments, the fraudulent reward parameter may include a parameter associated with a transaction amount of one or more fraudulent payment transactions performed by the agent and involving the account of the user. For example, the fraudulent reward parameter may include a fraudulent reward amount that is equal to the transaction amount of the one or more fraudulent payment transactions that were determined to be one or more non-fraudulent payment transactions by fraud detection system 102 using the fraud detection machine learning model. In some non-limiting embodiments, fraud detection system 102 may determine the fraudulent reward amount based on a plurality of fraudulent reward parameters associated with a transaction amount of a plurality of fraudulent payment transactions performed by the agent and involving the account of the user.

In some non-limiting embodiments, fraud detection system 102 may generate a plurality of fraudulent reward parameters for a sequence of transaction related actions based on a plurality of outputs of a fraud detection machine learning model. Fraud detection system 102 may determine a fraudulent reward amount based on the plurality of fraudulent reward parameters and assign the fraudulent reward amount to the sequence of transaction related actions. Fraud detection system 102 may store the fraudulent reward amount and the sequence of transaction related actions in a data structure.

In some non-limiting embodiments, fraud detection system 102 may assign the fraudulent reward parameter to a transaction related action (e.g., a transaction related action of a set of transaction related actions) and/or to a fraudulent payment transaction that was determined to be a non-fraudulent payment transaction by fraud detection system 102 using the fraud detection machine learning model. In some non-limiting embodiments, fraud detection system 102 may store the fraudulent reward parameter and the transaction related action in a data structure. Additionally or alternatively, fraud detection system 102 may store the fraudulent reward parameter and the fraudulent payment transaction in the data structure.

In some non-limiting embodiments, fraud detection system 102 may update an agent action machine learning model based on a fraudulent reward parameter for a transaction related action. For example, fraud detection system 102 may update a weight parameter of the agent action machine learning model based on the fraudulent reward parameter.

In some non-limiting embodiments, fraud detection system 102 may perform an action associated with enhancing fraud detection of the fraud detection machine learning model for a payment transaction to be conducted. For example, fraud detection system 102 may add transaction data associated with one or more fraudulent payment transactions performed by the agent involving the account of the user and determined to be one or more non-fraudulent payment transactions using the fraud detection machine learning model to a training data set of the fraud detection machine learning model. The fraud detection machine learning model may be retrained using the training data set and validated. In another example, fraud detection system may add an additional layer of authentication security when determining whether a payment transaction involving the account of the user is fraudulent or non-fraudulent. The additional layer of authentication security may include a request for an identification number (e.g., a personal identification number (PIN), a post number, and/or the like) associated with an account of a user and/or biometric identification data associated with a biometric identification (e.g., a fingerprint, a voice sample, an eye scan, a facial scan, and/or the like) of the user of the account.

In some non-limiting embodiments, fraud detection system 102 may determine whether the fraud detection machine learning model is deployed in an active setting. For example, fraud detection system 102 may determine whether the fraud detection machine learning model is in use by transaction service provider system 104 to determine whether a payment transaction (e.g., a payment transaction conducted in real-time) is fraudulent or non-fraudulent. In some non-limiting embodiments, fraud detection system 102 may perform an action associated with enhancing fraud detection of the fraud detection machine learning model for a payment transaction to be conducted based on determining that the fraud detection machine learning model is deployed in an active setting. In some non-limiting embodiments, fraud detection system 102 may forego performing the action associated with enhancing fraud detection of the fraud detection machine learning model for a payment transaction to be conducted based on determining that the fraud detection machine learning model is not deployed in an active setting.

Referring now to FIGS. 4A-4K, illustrated is a non-limiting embodiment or aspect of an implementation 400 of a process for evaluating a fraud detection system.

Figure 4A:
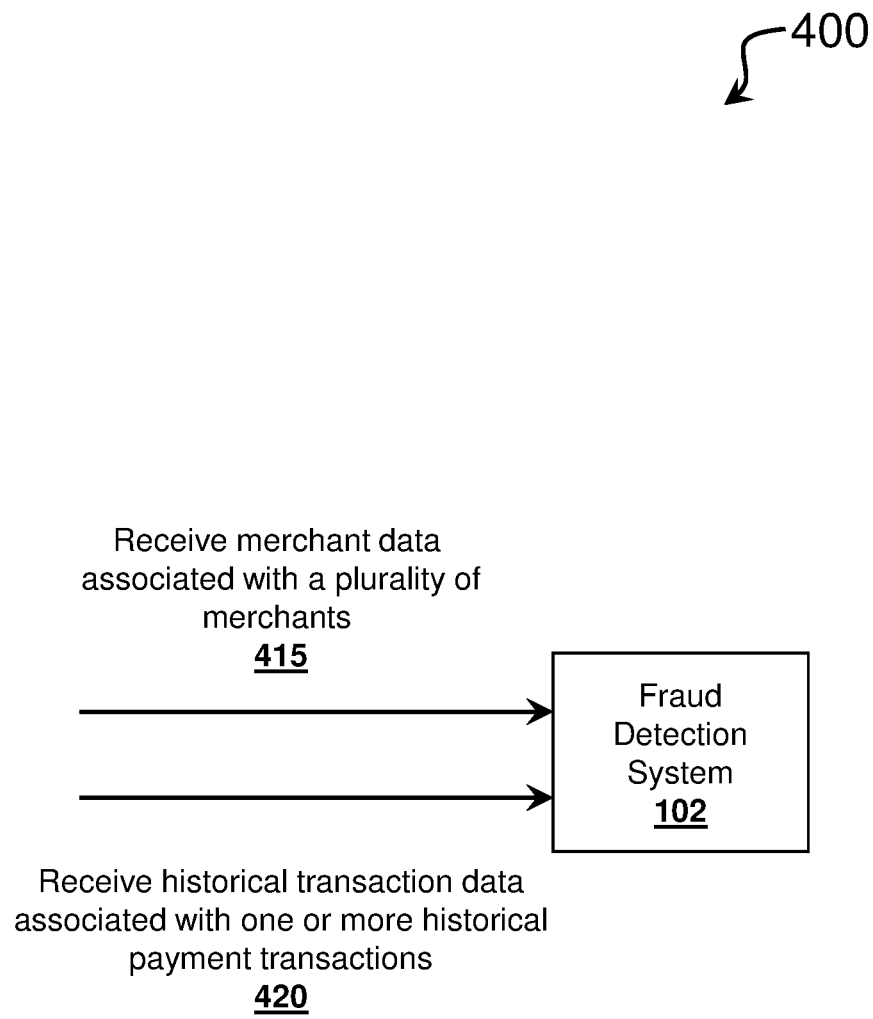

As illustrated by reference number 415 in FIG. 4A, fraud detection system 102 may receive merchant data associated with a plurality of merchants. For example, fraud detection system 102 may receive merchant data, where the merchant data includes data associated with locations of the plurality of merchants, data associated with the categories of the plurality of merchants, data associated with the business hours of the plurality of merchants and/or like data. In some non-limiting embodiments or aspects, the merchant data may include product list data associated with a plurality of product lists corresponding to the plurality of merchants (e.g., Coffee, Inc. [$4.55. $3.55, $2.55, $10, and/or the like]; Hotel, Inc. [$299, $399, $499, $999, and/or the like]; and/or the like). In some non-limiting embodiments or aspects, merchant data may include data associated with a range of prices for one or more goods and/or services sold by each merchant of the plurality of merchants, data associated with a combination of static prices and ranges of prices for one or more goods and/or services sold by each merchant of the plurality of merchants, data associated with one or more realistic prices for one or more goods and/or services sold by the merchant, data associated with one or more synthesized prices for one or more goods and/or services sold by the merchant, and/or the like.

As illustrated by reference number 420 in FIG. 4A, fraud detection system 102 may receive historical transaction data associated with one or more historical payment transactions involving the account of the user. In some non-limiting embodiments or aspects, the historical transaction data may include one or more indicators corresponding to one or more historical payment transactions associated with the historical transaction data. For example, the historical transaction data may include one or more indicators corresponding to one or more historical payment transactions, the one or more indicators indicating whether each corresponding historical payment transaction is a fraudulent payment transaction or a non-fraudulent payment transaction. In some non-limiting embodiments or aspects, the historical transaction data may include data associated with an issuer of a payment device where the payment device is associated with the account of the user. For example, the historical transaction data may include data associated with transaction amounts of one or more transactions involving an account, data associated with a time of one or more transactions involving an account, data associated with an identification of one or more frequently visited merchants (e.g., merchants visited more than a predetermined amount of times), data associated with one or more frequently visited areas (e.g., geographical areas), data associated with a number of merchants visited within a time period, data associated with an issuing bank, data associated with a credit score of an account holder of the account, and/or the like.

As illustrated by reference number 425 in FIG. 4B, fraud detection system 102 may determine a set of transaction related actions for an agent. For example, fraud detection system 102 may determine the set of transaction related actions for the agent where the set of transaction related actions includes one or more pre-determined transaction related actions and/or one or more generated transaction actions. The one or more transaction related actions may include combinations between a merchant and one or more products associated with the merchant.

Figure 4C:
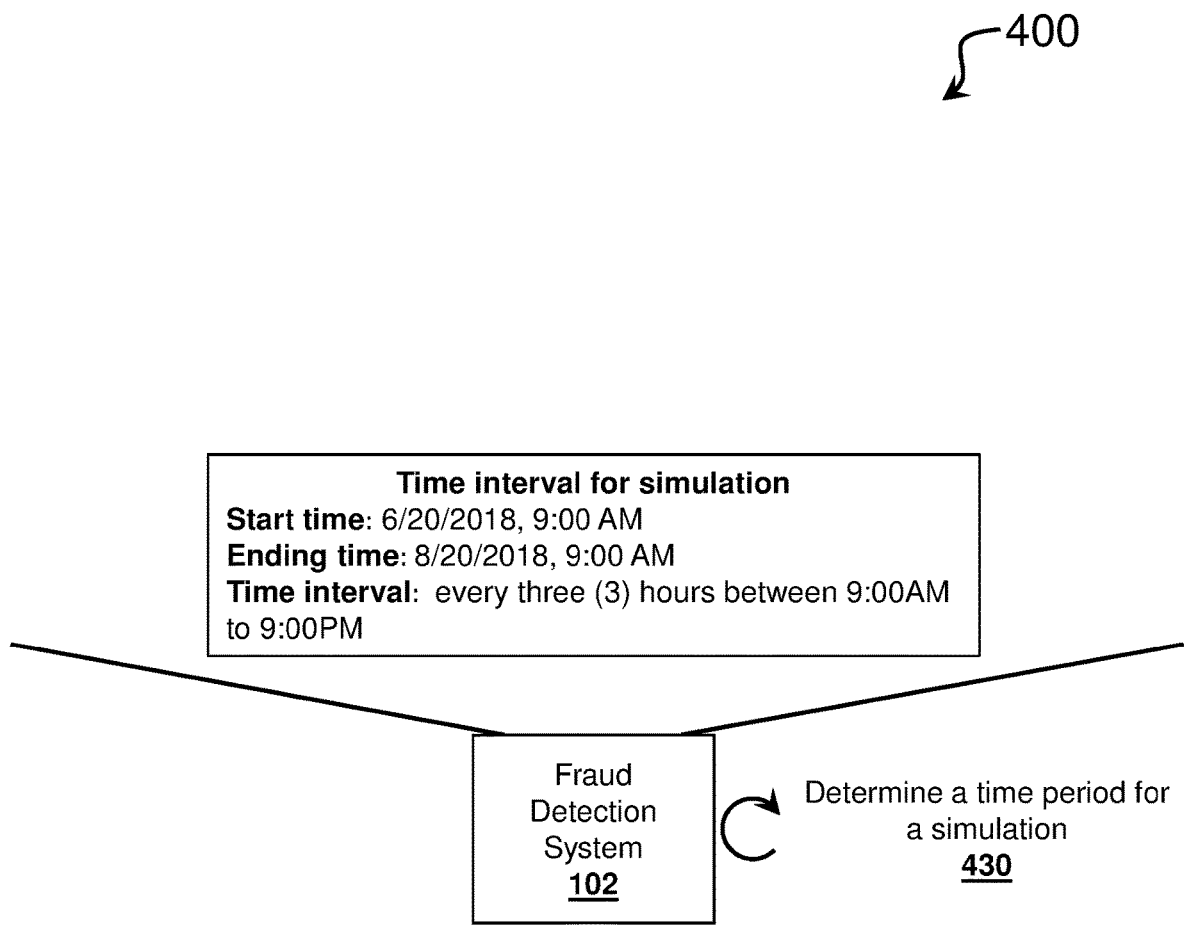

As illustrated by reference number 430 in FIG. 4C, fraud detection system 102 may determine a time interval for a simulation. For example, fraud detection system 102 may determine the time interval for the simulation, where the time interval includes a starting time and an ending time. The time interval may include a fixed number or a variant number. In some non-limiting embodiments or aspects, the simulation may involve fraud detection system 102 performing one or more transaction related actions of the set of transaction related actions for the agent during the time interval.

Figure 4D:
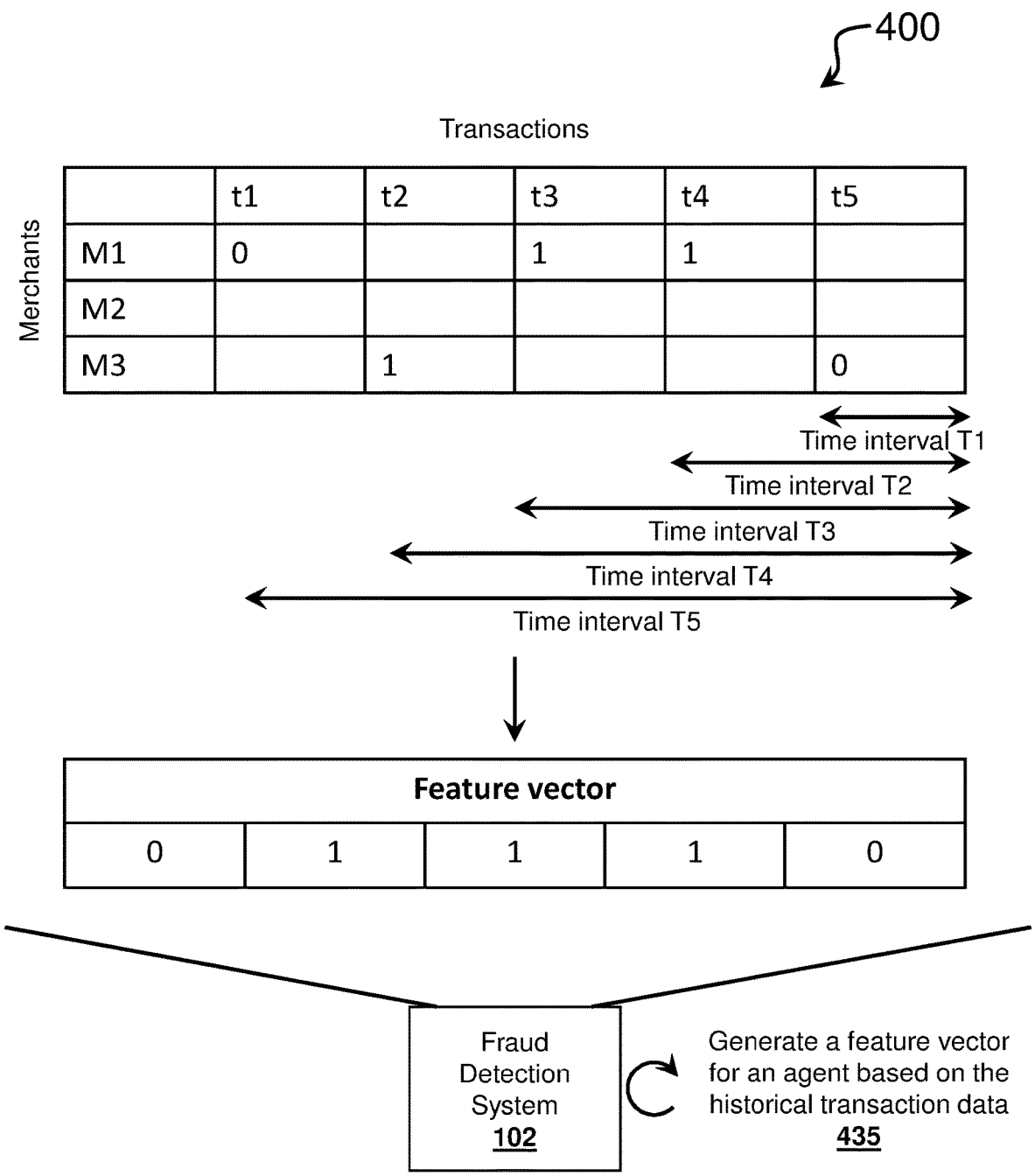

As illustrated by reference number 435 in FIG. 4D, fraud detection system 102 may generate a feature vector for an agent based on the historical transaction data associated with one or more historical payment transactions involving the payment account of the user. For example, fraud detection system 102 may generate the feature vector for the agent by concatenating the one or more historical payment transactions associated with the historical transaction data. In some non-limiting embodiments or aspects, fraud detection system 102 may generate the feature vector for the agent by concatenating the one or more indicators corresponding to one or more historical payment transactions associated with the historical transaction data. Additionally or alternatively, fraud detection system 102 may generate the feature vector for the agent by concatenating the amount of each transaction corresponding to one or more historical payment transactions associated with the historical transaction data. In some non-limiting embodiments or aspects, fraud detection system 102 may generate the feature vector for the agent by concatenating indications that the one or more historical payment transactions associated with the historical transaction data were approved (e.g., as fraud detection machine learning model being used to determine that the one or more historical payment transactions were not fraudulent) or not approved (e.g., as fraud detection machine learning model being used to determine that the one or more historical payment transactions were fraudulent).

Figure 4E:
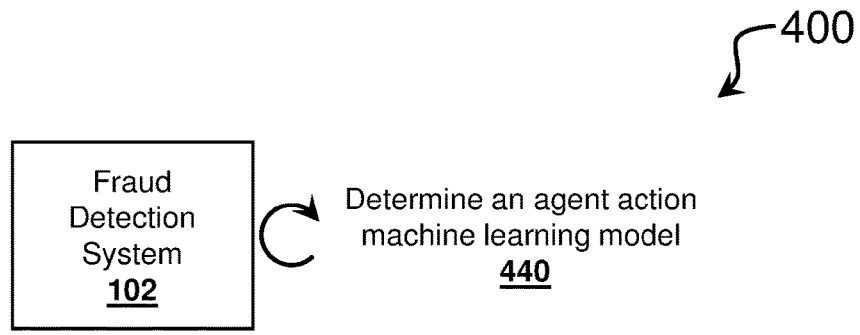

As illustrated by reference number 440 in FIG. 4E, fraud detection system 102 may determine an agent action machine learning model. In some non-limiting embodiments or aspects, the agent action machine learning model may be a deterministic machine learning model that maps one or more feature vectors to one or more transaction related actions. Additionally or alternatively, the agent action machine learning model may be a stochastic machine learning model that maps the one or more feature vectors to probability distributions for the transaction related actions. In some non-limiting embodiments or aspects, the agent action machine learning model may be a machine learning model such as, for example, a deep neural network with recurrent layer (e.g., a long short term memory (LSTM) network, a gated recurrent unit (GRU) neural network, and/or the like) and/or a random forest, a deep forest, a graph neural network, and/or other like machine learning models. In some non-limiting embodiments or aspects, fraud detection system 102 may use an action-value function and/or a value function to determine one or more updated parameters (e.g., weights, and/or the like) of the agent action machine learning model when updating parameters of the agent action machine learning model. In some non-limiting embodiments or aspects, the agent action machine learning model may include, from an input side to an output side, a first dense layer, a second dense layer fully and/or partially connected to the first dense layer, a third dense layer fully and/or partially connected to the second dense layer and/or the first dense layer, an LSTM layer fully and/or partially connected to the third dense layer, a fourth dense layer fully and/or partially connected to the LSTM layer, and a softmax layer fully and/or partially connected to the fourth dense layer, the softmax layer configured to provide the output of the agent action machine learning model. In some non-limiting embodiments or aspects, the LSTM layer may be configured to memorize a past status of the agent action machine learning model. In some non-limiting embodiments or aspects, the softmax layer may be configured to transform the output of the fourth dense layer into a probability distribution. In some non-limiting embodiments or aspects, the agent action machine learning model may include other deep neural network architectures such as convolutional layers, drop-out layers, and/or different activation functions such as, for example, a rectified linear unit (ReLU), a parametric rectified linear unit (PreLU), and/or the like.

Figure 4F:
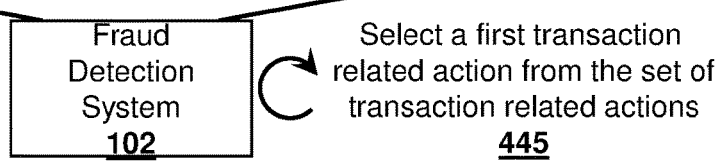

As illustrated by reference number 445 in FIG. 4F, fraud detection system 102 may select a first transaction related action from the set of transaction related actions. For example, fraud detection system 102 may select a first transaction related action based on an output provided by an agent action machine learning model. In such an example, fraud detection system 102 may provide, as input to the agent action machine learning model, the feature vector for an agent and, fraud detection system 102 may receive, as output from the agent action machine learning model, a prediction. The prediction may include data associated with a transaction related action. In some non-limiting embodiments or aspects, the agent action machine learning model may provide a prediction including the data associated with the transaction related action, where the transaction related action is determined to maximize future fraudulent reward amounts of the agent.

Figure 4G:
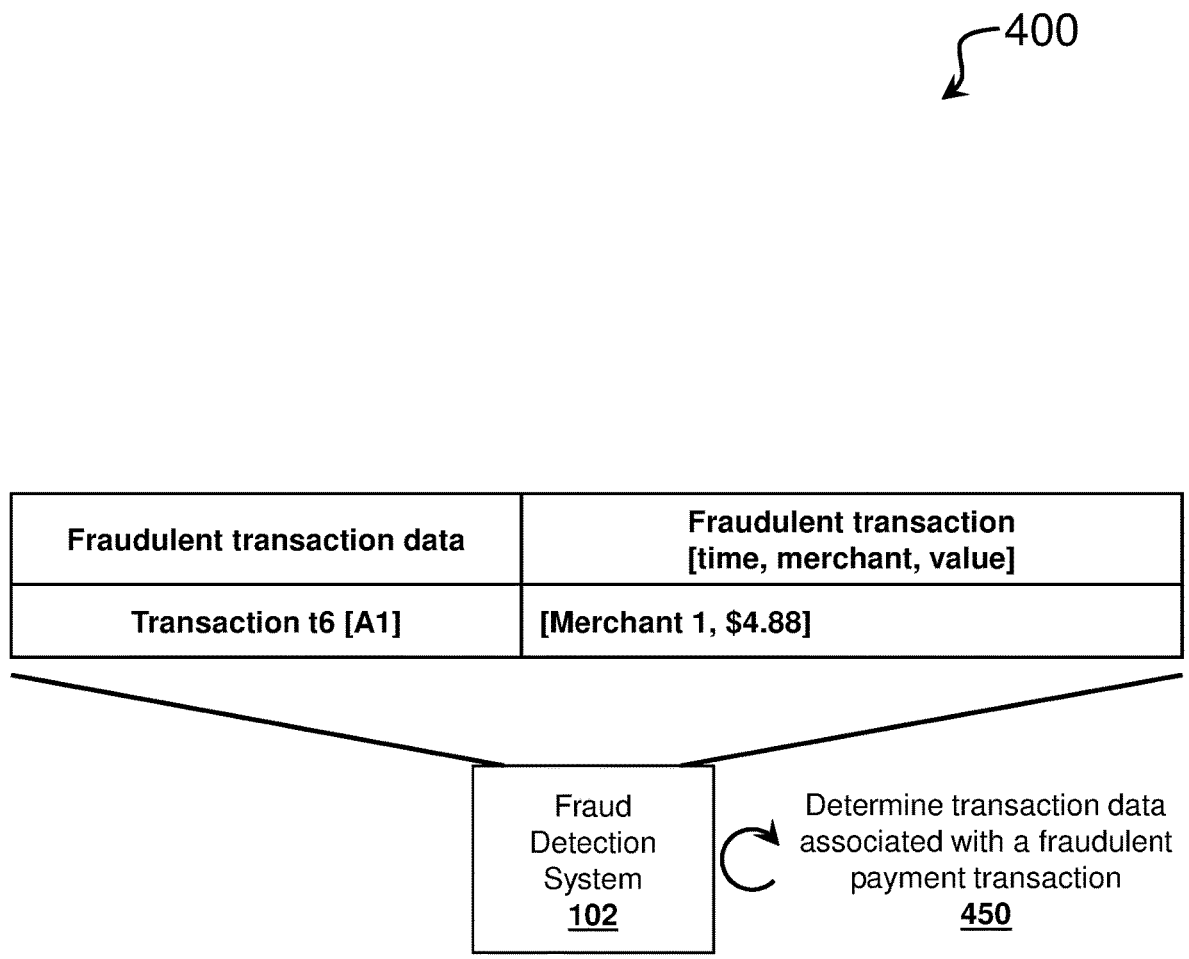

As illustrated by reference number 450 in FIG. 4G, fraud detection system 102 may determine transaction data associated with a fraudulent payment transaction. For example, fraud detection system 102 may determine the transaction data associated with the fraudulent payment transaction based on the transaction related action associated with the prediction output by the agent action machine learning model.

Figure 4H:
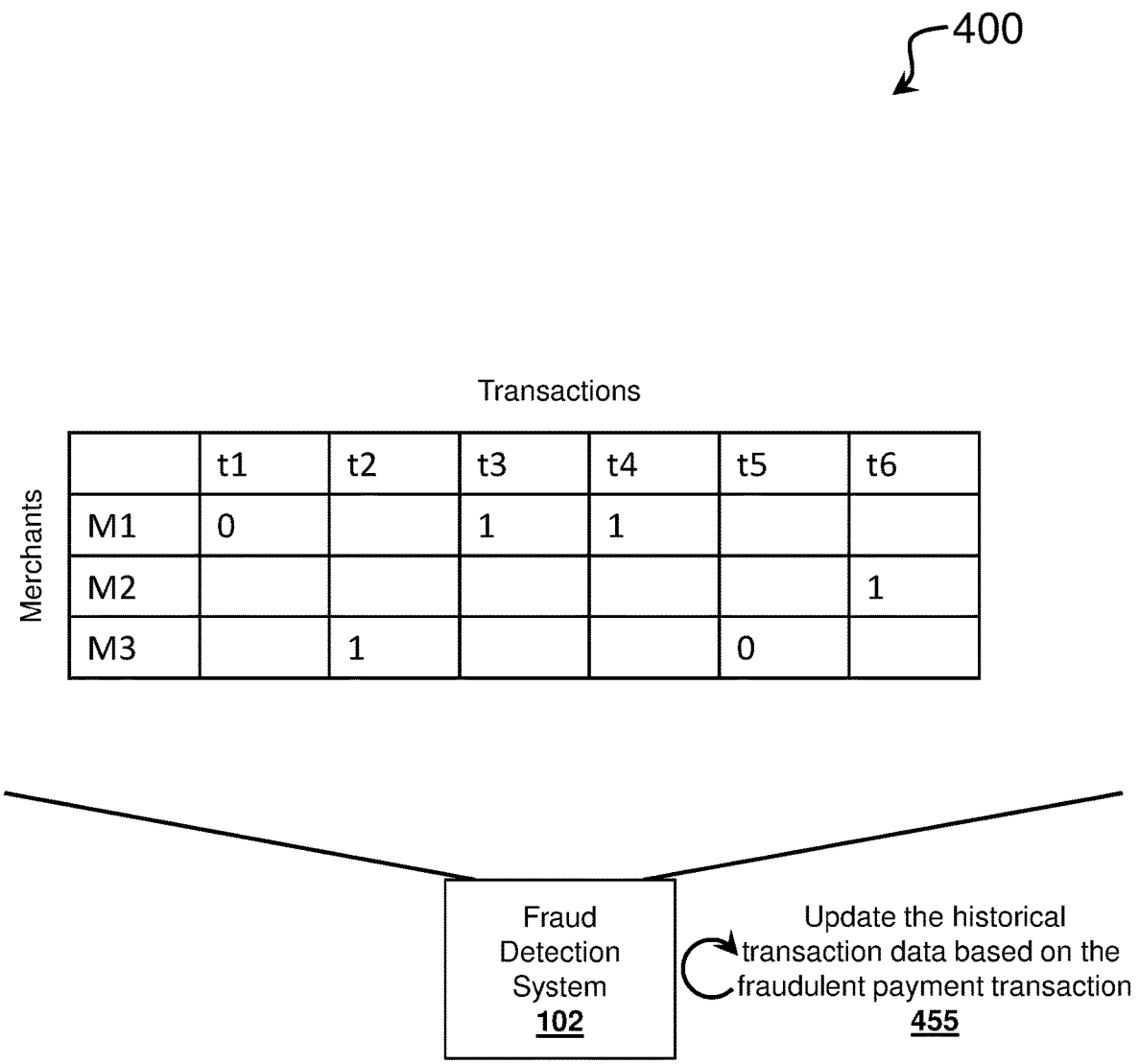

As illustrated by reference number 455 in FIG. 4H, fraud detection system 102 may update the historical transaction data associated with one or more historical payment transactions involving the account of the user based on the fraudulent payment transaction. For example, fraud detection system 102 may update the historical transaction data by appending the transaction data associated with the fraudulent payment transaction to the transaction data associated with the one or more historical payment transactions involving the account of the user.

Figure 4I:
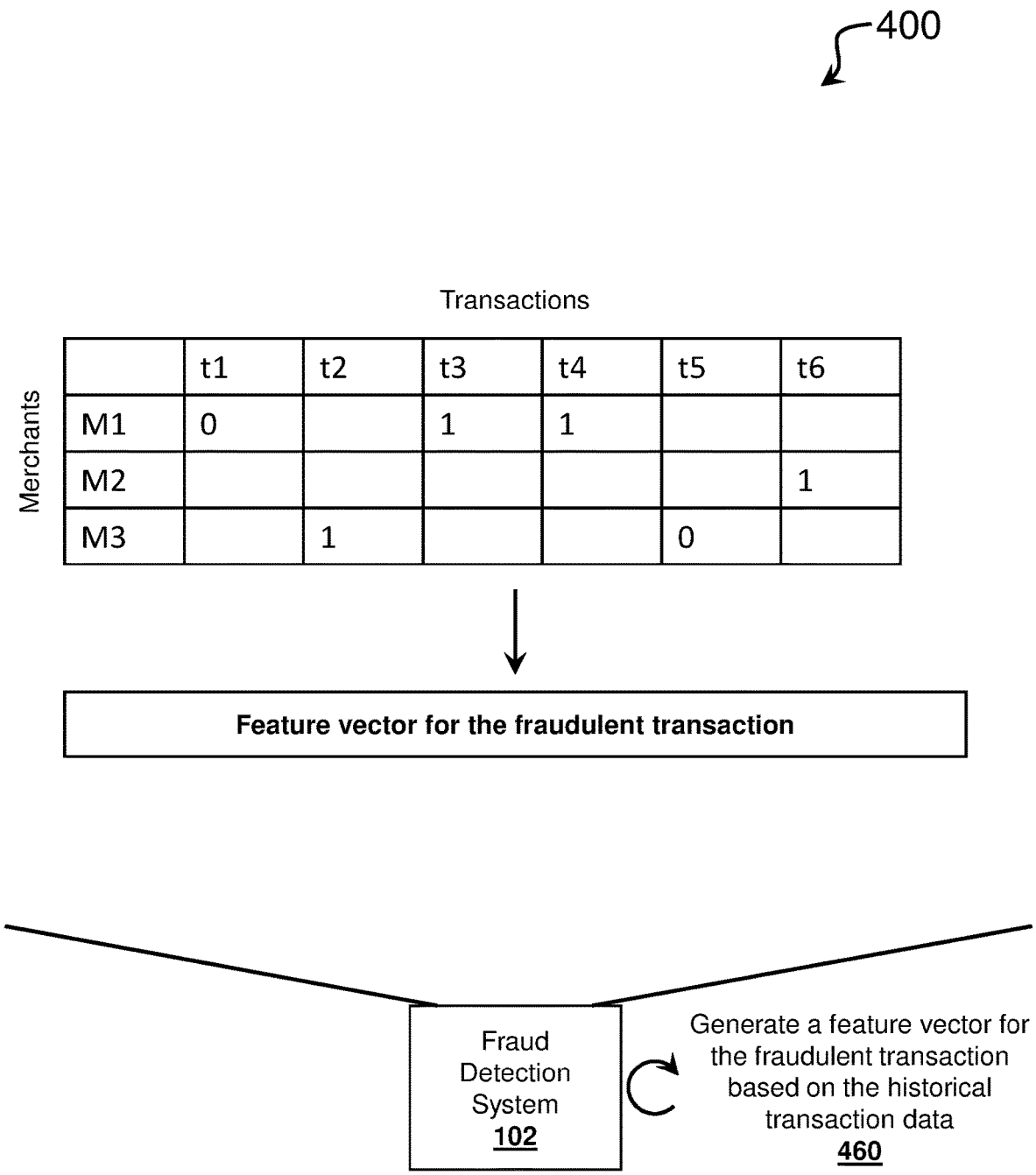

As illustrated by reference number 460 in FIG. 4I, fraud detection system 102 may generate a feature vector for the fraudulent transaction. For example, fraud detection system 102 may generate the feature vector for the fraudulent transaction based on the historical transaction data. In some non-limiting embodiments or aspects, fraud detection system 102 may generate the feature vector for the fraudulent transaction based on the updated historical transaction data. In an example, fraud detection system 102 may generate the feature vector, where the feature vector includes one or more features such as, for example, a time stamp feature associated with a time stamp of a fraudulent payment transaction, a location feature associated with a location (e.g., a simulated location of a cardholder) of the fraudulent transaction, an amount feature associated with an amount for the fraudulent payment transaction, a frequency feature associated with a frequency which the user of the account visits a location of the merchant, and/or like features.

Figure 4J:
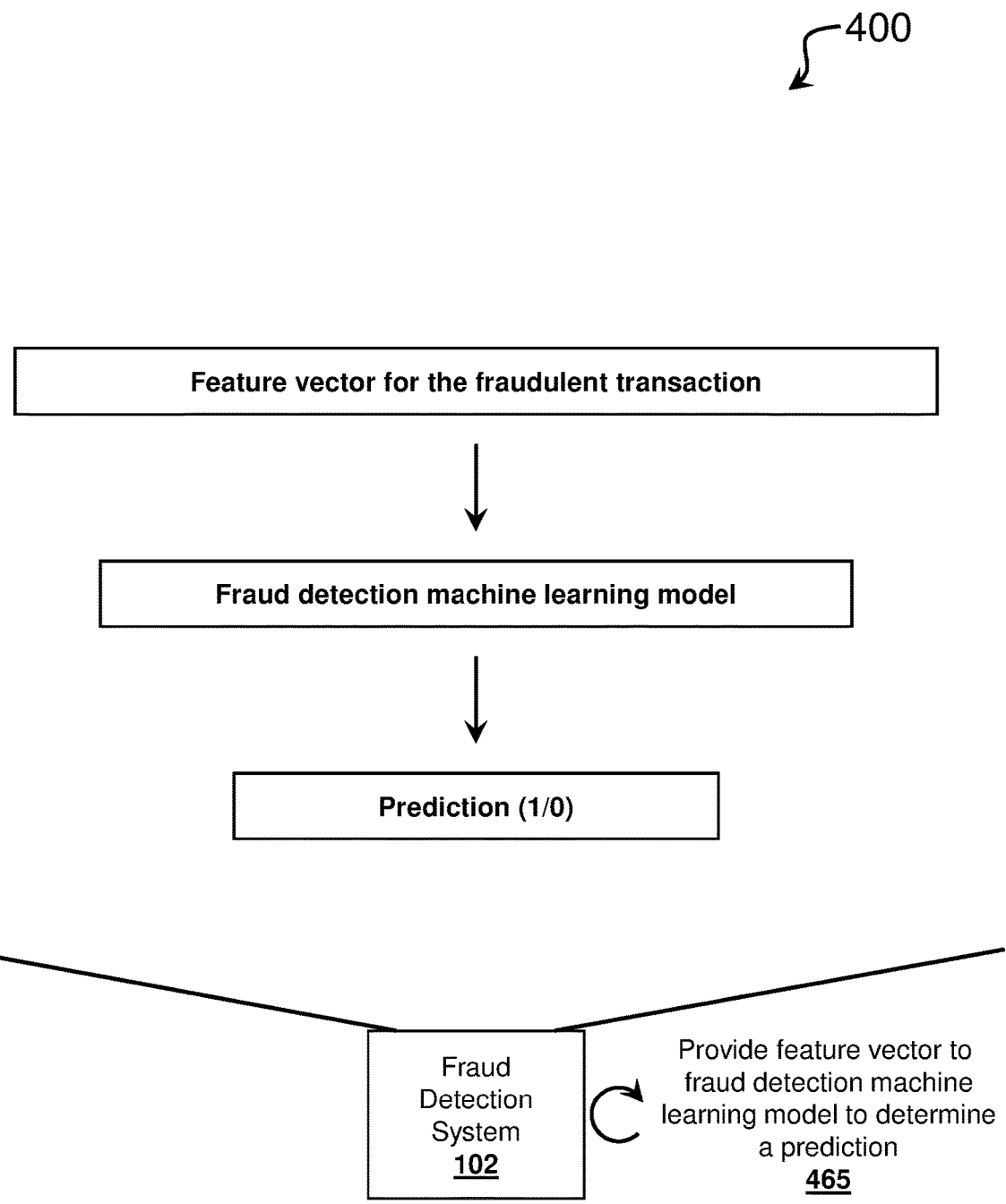

As illustrated by reference number 465 in FIG. 4J, fraud detection system 102 may provide the feature vector to a fraud detection machine learning model. For example, fraud detection system 102 may provide the feature vector to the fraud detection machine learning model to cause the fraud detection machine learning model to provide, as an output, a prediction. In such an example, the prediction may be associated with a determination that the fraudulent payment transaction associated with the transaction data is a fraudulent payment transaction or a non-fraudulent payment transaction.

Figure 4K:
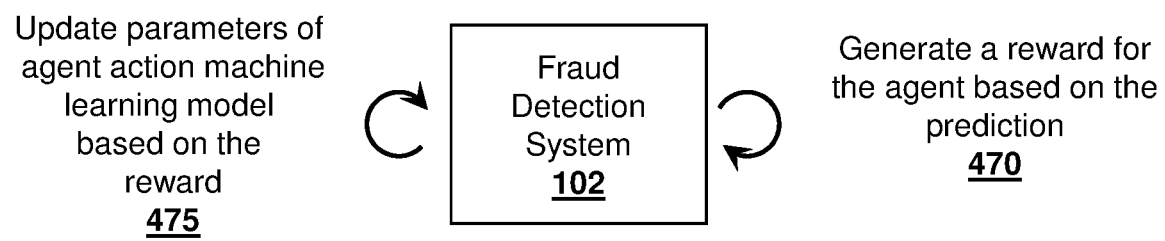

As illustrated by reference number 470 in FIG. 4K, fraud detection system 102 may generate a fraudulent reward amount for the agent based on the prediction output by the fraud detection machine learning model. For example, fraud detection system 102 may generate the fraudulent reward amount for the agent based on fraud detection system 102 determining that the prediction is associated with a determination that the fraudulent payment transaction associated with the transaction data is a fraudulent payment transaction or a non-fraudulent payment transaction. For example, fraud detection system 102 may determine the fraudulent reward amount based on subtracting the prediction from one (e.g., subtracting 1 from 1 where the prediction indicates that the fraudulent payment transaction is a fraudulent payment transaction or subtracting 0 from 1 where the prediction indicates that the fraudulent payment transaction is a non-fraudulent payment transaction), and multiplying the result by a transaction amount associated with the transaction related action. Additionally or alternatively, fraud detection system 102 may determine the fraudulent reward amount based on subtracting the prediction (e.g., 1 or 0) from one, and multiplying the result by one, such that when a fraudulent transaction is detected, the fraudulent reward amount is zero and when a fraudulent transaction is not detected, the result is one. In some non-limiting embodiments or aspects, fraud detection system 102 may determine a reward based on mapping the transaction related action to one or more predetermined reward amounts.

As illustrated by reference number 475 in FIG. 4K, fraud detection system 102 may update parameters of the agent action machine learning model based on the reward. For example, fraud detection system 102 may adjust one or more parameters of the agent action machine learning model based on the fraudulent reward amount to cause the agent action machine learning model to predict transaction related actions that are more likely to not be identified by the fraud detection machine learning model as fraudulent transactions. In some non-limiting embodiments or aspects, fraud detection system 102 may update parameters of the agent action machine learning model based on the fraudulent reward amount and a reinforcement learning algorithm. In one such example, the reinforcement learning algorithm may be defined as follows:

$$R_t = r_{t+1} + \gamma r_{t+2} + \gamma^2 r_{t+3} + \gamma^3 r_{t+4} + \ldots = \Sigma_{k=0}^{\infty} \gamma^k r_{t+k+1},$$

where $r_{t+1}$ is a predicted fraudulent reward amount associated with a fraudulent payment transaction that will be performed by the agent in the future, and $\gamma$ is a weight parameter with value range: $0<\gamma<1$. In this way, the agent (e.g., the agent action machine learning model) will learn to automatically select the most fragile merchant(s) to attack sequentially to optimize $R_t$. Multiple agents can also be deployed together with different reward or policy functions to optimize the aggregated $R_t$ over all the agents. By analyzing the actions the agent takes to attack the existing system, the user will localize the vulnerability of the existing fraud detection system.

In some non-limiting embodiments or aspects, fraud detection system 102 may store one or more agent related actions and corresponding fraudulent reward amounts in a database (e.g., an action-reward sequence buffer). For example, where fraud detection system 102 determines a plurality of agent related actions and corresponding rewards, fraud detection system 102 may store the plurality of agent related actions and corresponding fraudulent reward amount in the database. In some non-limiting embodiments or aspects, fraud detection system 102 may determine a plurality of collections that include one or more pluralities of agent related actions based on fraud detection system 102 storing the plurality of agent related actions and corresponding fraudulent reward amount in the database.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiments or aspects.

What is claimed is:

1. A method, comprising:
    determining, with at least one processor, a set of transaction related actions for an agent to be conducted during a simulation, wherein the agent comprises a simulated adversarial actor that is designed to engage in fraudulent conduct involving an account of a user, wherein each transaction related action comprises an action associated with conducting a payment transaction by the agent;
    selecting, with at least one processor, a first transaction related action from the set of transaction related actions for the agent based on a plurality of features associated with the agent, wherein selecting the first transaction related action from the set of transaction related actions for the agent comprises:
        determining the plurality of features associated with the agent based on one or more historical payment transactions of a plurality of historical payment transactions involving the account of the user; and selecting the first transaction related action from the set of transaction related actions for the agent based on an output from an agent action machine learning model and the plurality of features associated with the agent, wherein the plurality of features associated with the agent are provided as an input to the agent action machine learning model and the first transaction related action is an output of the agent action machine learning model based on the input;

generating, with at least one processor, transaction data associated with a fraudulent transaction based on the first transaction related action;

generating, with at least one processor, a feature vector, wherein the feature vector comprises transaction data associated with the fraudulent transaction;

providing, with at least one processor, the feature vector as an input to a fraud detection machine learning model;

determining, with at least one processor, an output of the fraud detection machine learning model based on the feature vector as the input;

generating, with at least one processor, a fraudulent reward parameter for the first transaction related action based on the output of the fraud detection machine learning model; and updating, with at least one processor, a weight parameter of the agent action machine learning model based on the fraudulent reward parameter and a reinforcement learning algorithm, the reinforcement learning algorithm being defined as follows:

$$R_t = r_{t+1} + \gamma r_{t+2} + \gamma^2 r_{t+3} + \gamma^3 r_{t+4} + \ldots = \Sigma_{k=0}^{\infty} \gamma^k r_{t+k+1},$$

where $r_{t+k+1}$ is a predicted fraudulent reward amount for a time interval of the simulation, wherein the predicted fraudulent reward amount is associated with a fraudulent payment transaction that will be conducted by the agent, and $\gamma^k$ is a weight parameter with value range: $0<\gamma<1$ that is chosen to optimize a fraudulent reward amount parameter, $R_t$.

2. The method of claim 1, further comprising:

generating, with at least one processor, a plurality of status indicators regarding fraudulent transaction outcomes associated with transaction related actions performed by the agent based on transaction data associated with the plurality of historical payment transactions, wherein each status indicator comprises an indication of a status of each historical payment transaction as being a fraudulent transaction or a non-fraudulent transaction, and wherein generating the feature vector comprises:

generating, with at least one processor, the feature vector based on the transaction data associated with the plurality of historical payment transactions, wherein the transaction data associated with the plurality of historical payment transactions comprises the plurality of status indicators, wherein the feature vector comprises transaction data associated with the fraudulent transaction, and wherein the fraudulent transaction is a fraudulent transaction of the plurality of historical payment transactions.

3. The method of claim 1, wherein determining the set of transaction related actions for the agent comprises: determining the set of transaction related actions for the agent based on historical transaction data associated with the one or more historical transactions.

4. The method of claim 1, further comprising:
updating the agent action machine learning model based on a fraudulent reward parameter for another transaction related action.

5. The method of claim 1, further comprising:
assigning, with at least one processor, the fraudulent reward parameter to the first transaction related action; and storing, with at least one processor, the first transaction related action and the fraudulent reward parameter in a data structure.

6. The method of claim 1, further comprising:
generating, with at least one processor, a plurality of fraudulent reward parameters for a sequence of transaction related actions based on a plurality of outputs of the fraud detection machine learning model;

determining, with at least one processor, a fraudulent reward amount based on the plurality of fraudulent reward parameters;

assigning, with at least one processor, the fraudulent reward amount to the sequence of transaction related actions; and storing the fraudulent reward amount and the sequence of transaction related actions in a data structure.

7. The method of claim 6, further comprising:
determining, with at least one processor, a plurality of sequences of transaction related actions that are each associated with a fraudulent reward amount; and selecting, with at least one processor, a sequence of transaction related actions from the plurality of sequences of transaction related actions that is associated with a maximum reward amount of a plurality of fraudulent reward amounts.

8. The method of claim 1, further comprising:
determining, with at least one processor, whether the fraud detection machine learning model is deployed in an active setting; and performing, with at least one processor, an action associated with enhancing fraud detection for a transaction to be conducted based on determining that the fraud detection machine learning model is deployed in the active setting.

9. A system, comprising:
at least one processor programmed or configured to:
determine a set of transaction related actions for an agent to be conducted during a simulation, wherein the agent comprises a simulated adversarial actor that is designed to engage in fraudulent conduct involving an account of a user, wherein each transaction related action comprises an action associated with conducting a payment transaction by the agent;

select a first transaction related action from the set of transaction related actions for the agent based on a plurality of features associated with the agent;

wherein, when selecting the first transaction related action, the at least one processor is programmed or configured to:

determine the plurality of features associated with the agent based on one or more historical payment transactions of a plurality of historical payment transactions involving the account of the user;

select the first transaction related action from the set of transaction related actions for the agent based on an output from an agent action machine learning model and the plurality of features associated with the agent, wherein the plurality of features associated with the agent are provided as an input to an agent action machine learning model, and the first transaction related action is the output of the agent action machine learning model based on the input;

generate transaction data associated with a fraudulent transaction based on the first transaction related action;

generate a feature vector, wherein the feature vector comprises transaction data associated with the fraudulent transaction;

provide the feature vector as an input to a fraud detection machine learning model;

determine an output of the fraud detection machine learning model based on the feature vector as the input;

generate a fraudulent reward parameter for the first transaction related action based on the output of the fraud detection machine learning model; and update a weight parameter of the agent action machine learning model based on the fraudulent reward parameter and a reinforcement learning algorithm, the reinforcement learning algorithm being defined as follows:

$$R_t = r_{t+1} + \gamma r_{t+2} + \gamma^2 r_{t+3} + \gamma^3 r_{t+4} + \ldots = \Sigma_{k=0}^{\infty} \gamma^k r_{t+k+1},$$

where $r_{t+k+1}$ is a predicted fraudulent reward amount for a time interval of the simulation, wherein the predicted fraudulent reward amount is associated with a fraudulent payment transaction that will be conducted by the agent, and $\gamma^k$ is a weight parameter with value range: $0 < \gamma < 1$ that is chosen to optimize a fraudulent reward amount parameter, $R_t$.

10. The system of claim 9, wherein the at least one processor is further programmed or configured to:

generate a plurality of status indicators regarding fraudulent transaction outcomes associated with transaction related actions performed by the agent based on transaction data associated with a plurality of payment transactions, wherein each status indicator comprises an indication of a status of each historical payment transaction as being a fraudulent transaction or a non-fraudulent transaction, and wherein, when generating the feature vector, the at least one processor is programmed or configured to:

generate the feature vector based on the transaction data associated with the plurality of historical payment transactions, wherein the transaction data associated with the plurality of historical payment transactions comprises the plurality of status indicators, wherein the feature vector comprises transaction data associated with the fraudulent transaction, and wherein the fraudulent transaction is a fraudulent transaction of the plurality of historical payment transactions.

11. The system of claim 9, wherein the at least one processor is further programmed or configured to:

update the agent action machine learning model based on a fraudulent reward parameter for another transaction related action.

12. A computer program product comprising at least one non-transitory computer-readable medium comprising one or more instructions that, when executed by at least one processor, cause the at least one processor to:

determine a set of transaction related actions for an agent to be conducted during a simulation, wherein the agent comprises a simulated adversarial actor that is designed to engage in fraudulent conduct involving an account of a user, wherein each transaction related action comprises an action associated with conducting a payment transaction by the agent;

select a first transaction related action from the set of transaction related actions for the agent based on a plurality of features associated with the agent; wherein, the one or more instructions that cause the at least one processor to select the first transaction related action from the set of transaction related actions for the agent, cause the at least one processor to:

determine the plurality of features associated with the agent based on one or more historical payment transactions of a plurality of historical payment transactions involving the account of the user;

select the first transaction related action from the set of transaction related actions for the agent based on an output from an agent action machine learning model and the plurality of features associated with the agent, wherein the plurality of features associated with the agent are provided as an input to an agent action machine learning model, and the first transaction related action is the output of the agent action machine learning model based on the input;

generate transaction data associated with a fraudulent transaction based on the first transaction related action;

generate a feature vector, wherein the feature vector comprises transaction data associated with the fraudulent transaction;

provide the feature vector as an input to a fraud detection machine learning model;

determine an output of the fraud detection machine learning model based on the feature vector as the input;

generate a fraudulent reward parameter for the first transaction related action based on the output of the fraud detection machine learning model; and update a weight parameter of the agent action machine learning model based on the fraudulent reward parameter for the first transaction related action and a reinforcement learning algorithm, the reinforcement learning algorithm being defined as follows:

$$R_t = r_{t+1} + \gamma r_{t+2} + \gamma^2 r_{t+3} + \gamma^3 r_{t+4} + \ldots = \Sigma_{k=0}^{\infty} \gamma^k r_{t+k+1},$$

where $r_{t+k+1}$ is a predicted fraudulent reward amount for a time interval of the simulation, wherein the predicted fraudulent reward amount is associated with a fraudulent payment transaction that will be conducted by the agent, and $\gamma^k$ is a weight parameter with value range: $0 < \gamma < 1$ that is chosen to optimize a fraudulent reward amount parameter, $R_t$.

13. The computer program product of claim 12, wherein the one or more instructions further cause the at least one processor to:

generate a plurality of status indicators regarding fraudulent transaction outcomes associated with transaction related actions performed by the agent based on transaction data associated with a plurality of payment transactions, wherein each status indicator comprises an indication of a status of each historical payment transaction as being a fraudulent transaction or a non-fraudulent transaction, and wherein, the one or more instructions that cause the at least one processor to generate the feature vector, cause the at least one processor to:

generate the feature vector based on the transaction data associated with the plurality of historical payment transactions, wherein the transaction data associated with the plurality of historical payment transactions comprises the plurality of status indicators, wherein the feature vector comprises transaction data associated with the fraudulent transaction, and wherein the fraudulent transaction is a fraudulent transaction of the plurality of historical payment transactions.

14. The computer program product of claim 12, wherein the one or more instructions that cause the at least one processor to determine the set of transaction related actions for the agent, cause the at least one processor to:
determine the set of transaction related actions for the agent based on historical transaction data associated with the one or more historical transactions.

15. The computer program product of claim 12, wherein the one or more instructions further cause the at least one processor to:
assign the fraudulent reward parameter to the first transaction related action; and
store the first transaction related action and the fraudulent reward parameter in a data structure.

16. The method of claim 1, wherein determining the plurality of features associated with the agent based on one or more historical payment transactions of a plurality of historical payment transactions comprises:
determining the plurality of features associated with the agent based on one or more previously-processed fraudulent payment transactions involving an account of a user.

17. The method of claim 1, further comprising:
adding the transaction data associated with the fraudulent transaction to a training data set of the fraud detection machine learning model; and
retraining the fraud detection machine learning model using the training data set.

18. The system of claim 9, wherein, when determining the plurality of features associated with the agent based on one or more historical payment transactions of the plurality of historical payment transactions, the at least one processor is programmed or configured to:
determine the plurality of features associated with the agent based on one or more previously-processed fraudulent payment transactions involving an account of a user.

19. The system of claim 9, wherein the at least one processor is further programmed or configured to:
add the transaction data associated with the fraudulent transaction to a training data set of the fraud detection machine learning model; and
retrain the fraud detection machine learning model using the training data set.

20. The computer program product of claim 12, wherein the one or more instructions further cause the at least one processor to:
add the transaction data associated with the fraudulent transaction to a training data set of the fraud detection machine learning model; and
retrain the fraud detection machine learning model using the training data set.

* * * * *